US008103804B2

(12) United States Patent
Koka et al.

(10) Patent No.: US 8,103,804 B2
(45) Date of Patent: Jan. 24, 2012

(54) METHOD AND SYSTEM FOR EMBEDDED REGENERATIVE LICENSING

(75) Inventors: Vikram Koka, Fremont, CA (US); Ann Shvarts, San Jose, CA (US)

(73) Assignee: Flexera Software, Inc., Schaumburg, IL (US)

( * ) Notice: Subject to any disclaimer, the term of this patent is extended or adjusted under 35 U.S.C. 154(b) by 147 days.

(21) Appl. No.: 12/269,842

(22) Filed: Nov. 12, 2008

(65) Prior Publication Data

US 2010/0121990 A1 May 13, 2010

(51) Int. Cl.
*G06F 3/00* (2006.01)
(52) U.S. Cl. ............... 710/7; 710/16; 726/26; 726/31
(58) Field of Classification Search .................. None
See application file for complete search history.

(56) References Cited

U.S. PATENT DOCUMENTS

| 7,613,119 | B2 * | 11/2009 | Zuniga et al. | 370/236 |
| 7,730,014 | B2 * | 6/2010 | Hartenstein et al. | 705/7 |
| 7,752,139 | B2 * | 7/2010 | Hu | 705/59 |
| 2006/0015502 | A1 * | 1/2006 | Szucs | 707/9 |
| 2006/0223503 | A1 * | 10/2006 | Muhonen et al. | 455/414.1 |
| 2008/0151778 | A1 * | 6/2008 | Venkitaraman et al. | 370/254 |

OTHER PUBLICATIONS

IBM, "Flexbile License Manager," Feb. 1, 2007, IP.com, pp. 1-4.*
Guemhioui et al., "A Transparent and Evolvable Licensing Object Service," 2005, IEEE, pp. 1-8.*

* cited by examiner

*Primary Examiner* — Eron J Sorrell
(74) *Attorney, Agent, or Firm* — Orrick, Herrington & Sutcliffe, LLP

(57) ABSTRACT

A method and system for embedded regenerative licensing are disclosed. According to one embodiment, a computer-implemented method, comprises transmitting a first capability request for a first hardware device to a hardware adapter. A second capability request for a second hardware device is transmitted to the hardware adapter. A first device capability response for the first hardware device is received from the hardware adapter. The first device capability response comprises a first timestamp, a first unique identifier for the first hardware device, and a first functions list to disable on the first hardware device. A second device capability response for the second hardware device is received from the hardware adapter. The second device capability response comprises a second timestamp, a second unique identifier for the second hardware device, and a second functions list including one or more functions from the first hardware device to enable on the second hardware device.

18 Claims, 7 Drawing Sheets

METHOD AND SYSTEM FOR EMBEDDED REGENERATIVE LICENSING

TECHNICAL FIELD

The field of the invention relates generally to computer systems and more particularly relates to a method and system for embedded regenerative licensing.

BACKGROUND

Device manufacturers commonly sell products into different markets or price points, though the devices have similar bills of material and/or manufacturing cost. The manufacturer differentiates the devices by the capabilities they offer, for example a device with fewer capabilities may sell for a lower price than the same device with additional or more sophisticated capabilities. Issues arise when customers become interested in upgrading a device for more capabilities. A customer may have initially desired a device with fewer capabilities at the lower price point, and later decided the more sophisticated (and, consequently perhaps, more expensive) suite of capabilities is necessary or preferred. In terms of licensing, rights are defined on a host and licensed software gets tied to a hardware identity, limiting capability upgrade opportunities or hardware substitution.

SUMMARY

A method and system for embedded regenerative licensing are disclosed. According to one embodiment, a computer-implemented method, comprises transmitting a first capability request for a first hardware device to a hardware adapter. A second capability request for a second hardware device is transmitted to the hardware adapter. A first device capability response for the first hardware device is received from the hardware adapter. The first device capability response comprises a first timestamp, a first unique identifier for the first hardware device, and a first functions list to disable on the first hardware device. A second device capability response for the second hardware device is received from the hardware adapter. The second device capability response comprises a second timestamp, a second unique identifier for the second hardware device, and a second functions list including one or more functions from the first hardware device to enable on the second hardware device.

The above and other preferred features, including various novel details of implementation and combination of elements will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
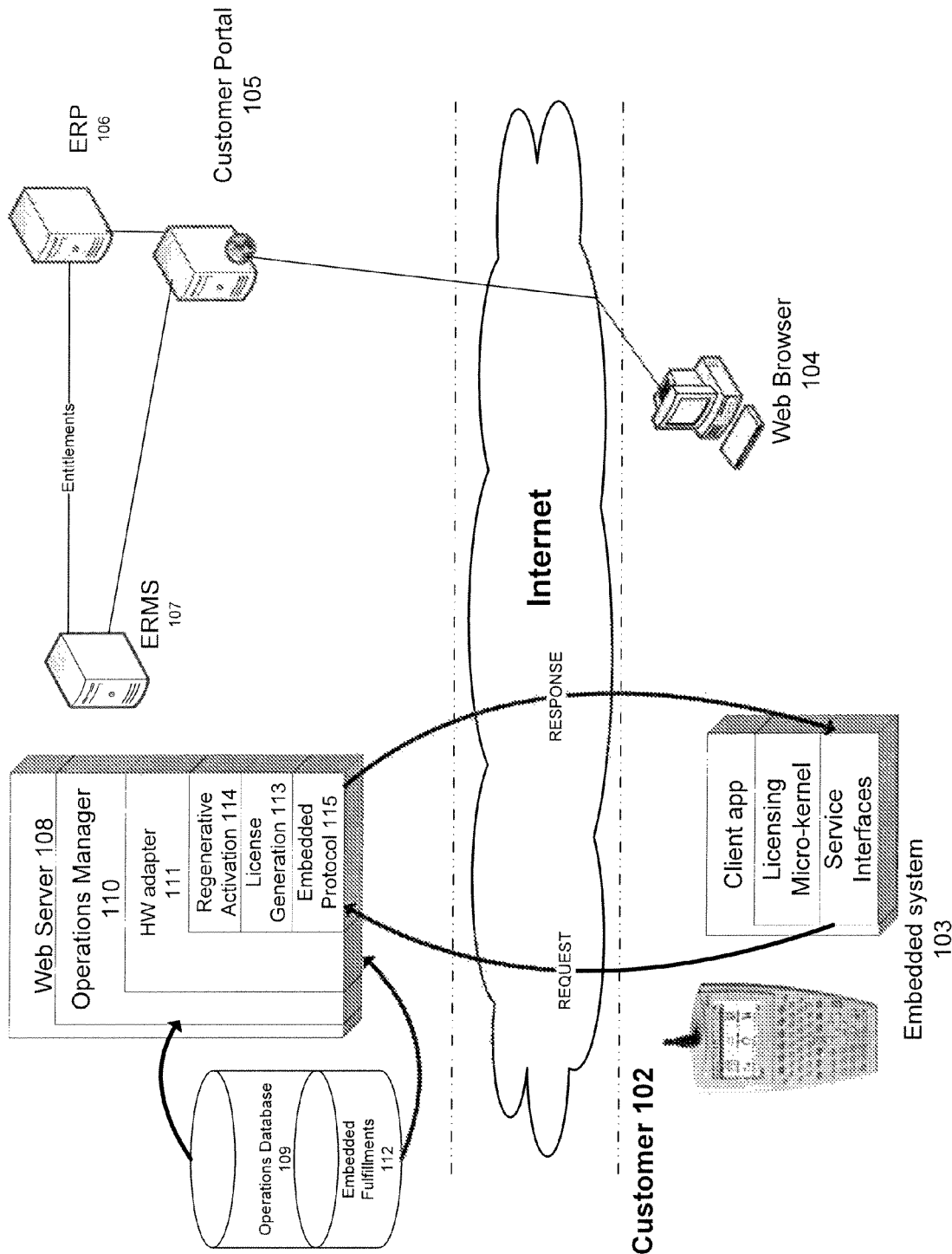
FIG. 1 is a system level diagram of an exemplary embedded regenerative licensing system, according to one embodiment.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

DETAILED DESCRIPTION

A method and system for embedded regenerative licensing are disclosed. According to one embodiment, a computer-implemented method, comprises transmitting a first capability request for a first hardware device to a hardware adapter. A second capability request for a second hardware device is transmitted to the hardware adapter. A first device capability response for the first hardware device is received from the hardware adapter. The first device capability response comprises a first timestamp, a first unique identifier for the first hardware device, and a first functions list to disable on the first hardware device. A second device capability response for the second hardware device is received from the hardware adapter. The second device capability response comprises a second timestamp, a second unique identifier for the second hardware device, and a second functions list including one or more functions from the first hardware device to enable on the second hardware device.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a system level diagram of an exemplary embedded regenerative licensing system, according to one embodiment. A hardware manufacturer 101 grants licensing rights to a customer 102 possessing a device such as an embedded system 103. The embedded system 103 includes a device and a client architecture made up of a client application, licensing micro-kernel, and service interfaces such as in FIG. 2 described below.

The customer 102, via web browser 104, accesses a customer portal 105 hosted by the hardware manufacturer 101. Through the customer portal 105 the customer 102 may request capabilities by communicating with the resource planner (ERP) 106 and pay for the capabilities desired on the customer's embedded system 103. The capabilities desired may be initial functional capabilities for the embedded system 103 and they may also be an upgrade in functionality for an already deployed embedded system 103. The resource planner (ERP) 106 communicates to the entitlement relationship management system (ERMS) 107 the entitlements for the embedded system 103. The customer 102 is then instructed to refresh (or restart or automatically restart after a pre-configured interval based on manufacturer preference) the embedded system 103, and upon reconnection, the embedded system 103 requests instructions from the hardware adapter 111 on the operations manager 110 regarding what capabilities should exist on the system.

The hardware adapter 111 responds with a capability response, and the embedded system 103 functions with the appropriate capabilities it is licensed to utilize. The operations manager 110 communicates regularly with an operations database 109 to store and retrieve licensing information. The hardware adapter 111 is also in communication with an embedded fulfillments database 112 for storage and retrieval of what capabilities have been fulfilled on a device. The hardware adapter 111 handles license generation 113, the license generation 113 block generates licenses in the binary format accepted by the embedded system 103. This format is different from a regular license file (which may be plain text) or regular activation (xml) formats. Regenerative activation 114 is also handled by the hardware adapter 111, the regenerative licensing 114 block that processes regenerative logic. As an example, in a secure re-host scenario (or transfer of capabilities from one device to another), this block would verify that the original device released its capabilities before granting the capabilities to the replacement device. The hardware adapter 111 also contains an embedded protocol 115 for interfacing with a device or embedded system 103. The embedded protocol 115 block decodes and encodes requests and responses based on the protocol defined for the embedded system 103.

Figure 2:
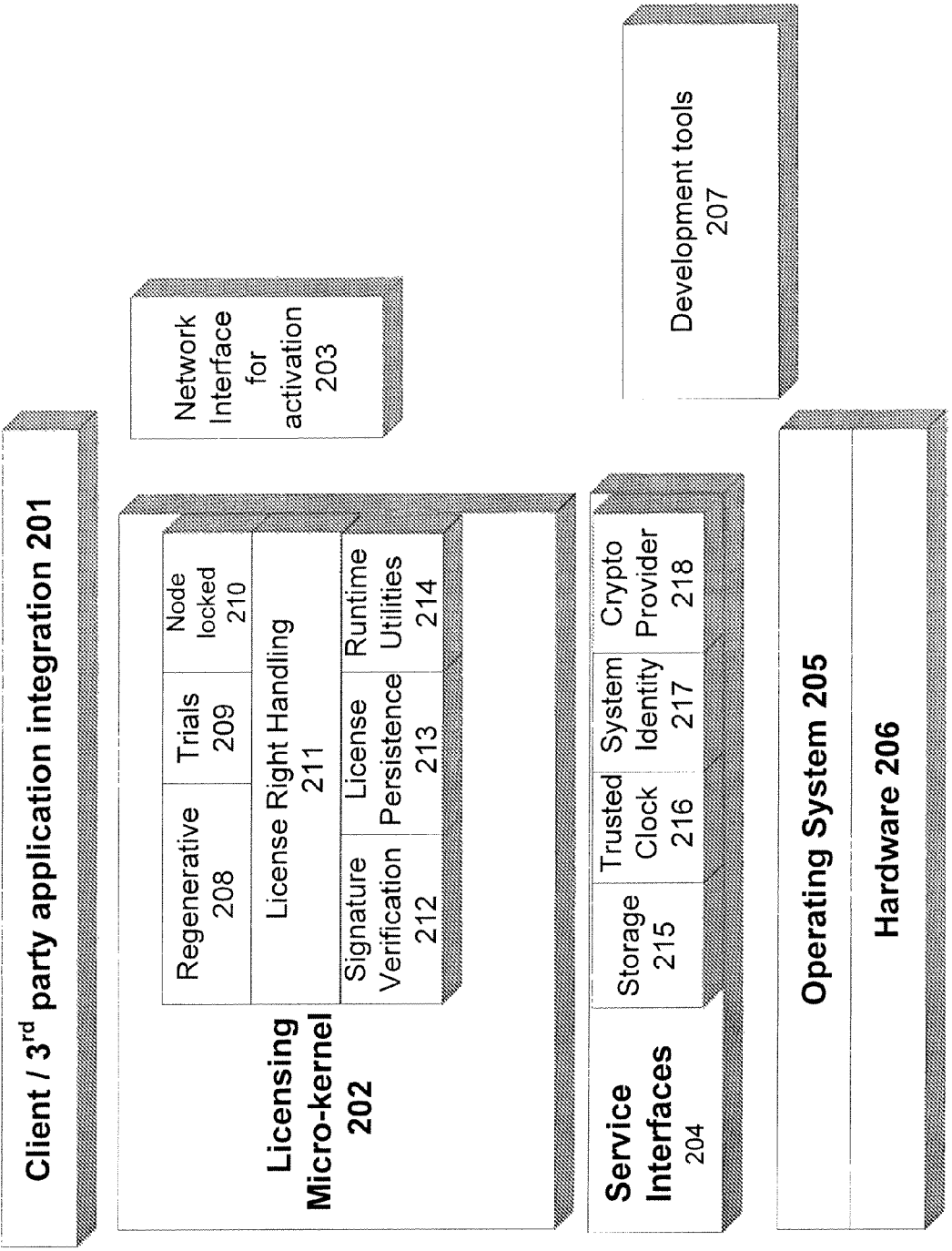
FIG. 2 is a block level diagram of an exemplary client architecture within an embedded regenerative licensing system, according to one embodiment.

FIG. 2 is a block level diagram of an exemplary client architecture within an embedded regenerative licensing system, according to one embodiment. A client or third party application integration 201 may include a licensing micro-kernel 202, service interfaces 204, and uses the operating system 205 and system hardware 206. Device activation involves a network interface 203 for communication between the embedded system 103 and the provider server. The network interface 203, in one embodiment, is delivered to the customer by the provider and is overwritten by the customer based on device configurations. Various development tools 207 may also be in place, including in one example a test server or a license conversion utility to assist in development of the license enabled application. In one embodiment, the licensing micro-kernel 202 is delivered by the provider as pre-built libraries, with services included that can be broken out as separate services such as signature verification 212, license persistence 213, and runtime utilities 214.

Signature verification 212 is a logical block that verifies signatures on the individual feature lines contained within various license rights. Signature verification 212 assures the authenticity of the feature lines and prevents license tampering. License persistence block 213 securely stores regenerative and trial license rights on an embedded device 103. Regenerative license rights are stored on the device so the capabilities are available in-between regenerations from the management server. Information about trial license rights stored on the embedded system 103 to ensure proper expiration. Runtime utilities 214 represent wrappers around runtime functions, the wrappers are used to provide encapsulation from various implementations of customizable operating systems calls. In one embodiment, the licensing micro-kernel 202 handles license rights (license right handling 211), and processes and maintains license rights of various models. Some supported license models may include trials 209, regenerative 208, and node locked 210. The trials 209 license model includes license rights available for a specified duration of time. The regenerative 208 license model specializes in the continuous license rights updates from the management server to the embedded system 103. The node locked 210 license model specializes in the license rights locked to a given device or node. Other interfaces for storage 215, time (verification of a trusted clock 216), system identity 217 verification, and cryptography (crypto provider 218) can be delivered by the provider and overwritten by the customer/manufacturer based on particular device configurations. Storage 215 block stores license rights on the device.

A reference implementation is provided by the provider for the most common embedded operating system, though the manufacturer may way to provide its own implementation to control secure location of the storage and take advantage of the device file system. The trusted clock 216 block the accurate system time of the device. This helps prevent unauthorized use of expired licenses. The system identity block 217 accesses the device identification. Block 217 uses manufacturer specific implementations because various manufacturers have unique ways of identifying devices. The crypto provider block 218 handles the cryptography needs of the license-enabled application.

Figure 3:
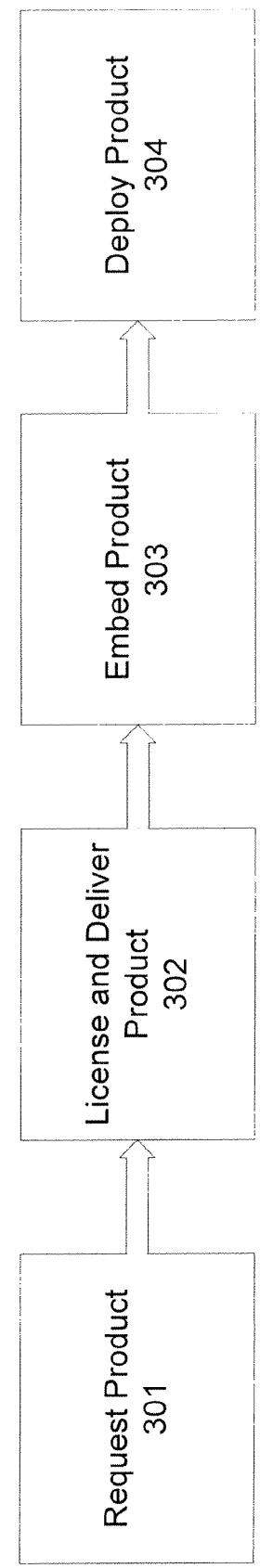
FIG. 3 is an exemplary flow diagram depicting the acquisition and deployment of an embedded regenerative licensing product from a provider to a manufacturer, according to one embodiment.

FIG. 3 is an exemplary flow diagram depicting the acquisition and deployment of an embedded regenerative licensing product from a provider to a manufacturer, according to one embodiment. A device manufacturer requests the embedded regenerative licensing product 301 from a provider, and upon completing any necessary transaction details the provider licenses and delivers the product 302 to the device manufacturer. The device manufacturer may then embed the product 303 on any of its intended devices (in any customized implementation as is possible), and deploy the product 304 for use on its devices in the field.

Figure 4:
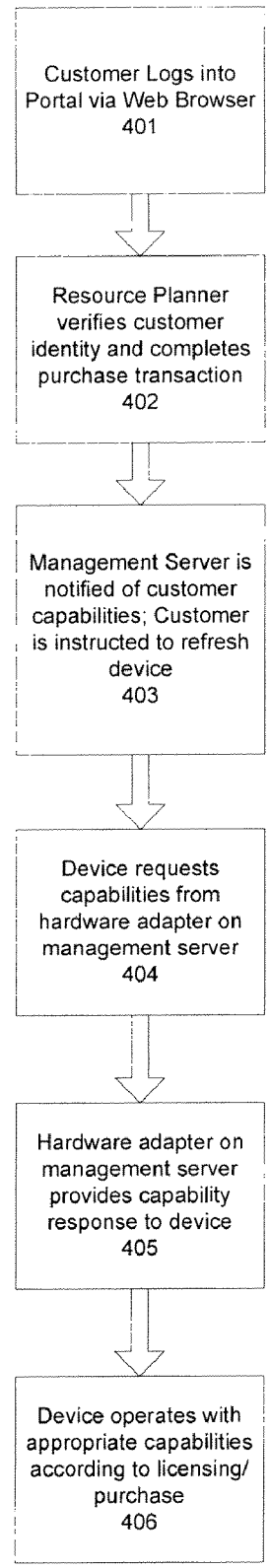
FIG. 4 illustrates an exemplary device licensing flow within an embedded regenerative licensing system, according to one embodiment.

FIG. 4 illustrates an exemplary device licensing flow within an embedded regenerative licensing system, according to one embodiment. A customer logs into a portal via web browser 401. A resource planner system then verifies the customer identity and assists in completing a purchase transaction 402. A management server is notified of purchased or otherwise authorized device capabilities for the customer and an associated device. The customer is instructed to refresh the device 403. Upon refresh, the device sends a request to a hardware adapter on the management server for what capabilities it should allow 404, and the hardware adapter responds with a capability response to the device 405. The device can then be disconnected from the management server and continues to operate with the appropriate capabilities according to licensing 406.

Figure 5A:
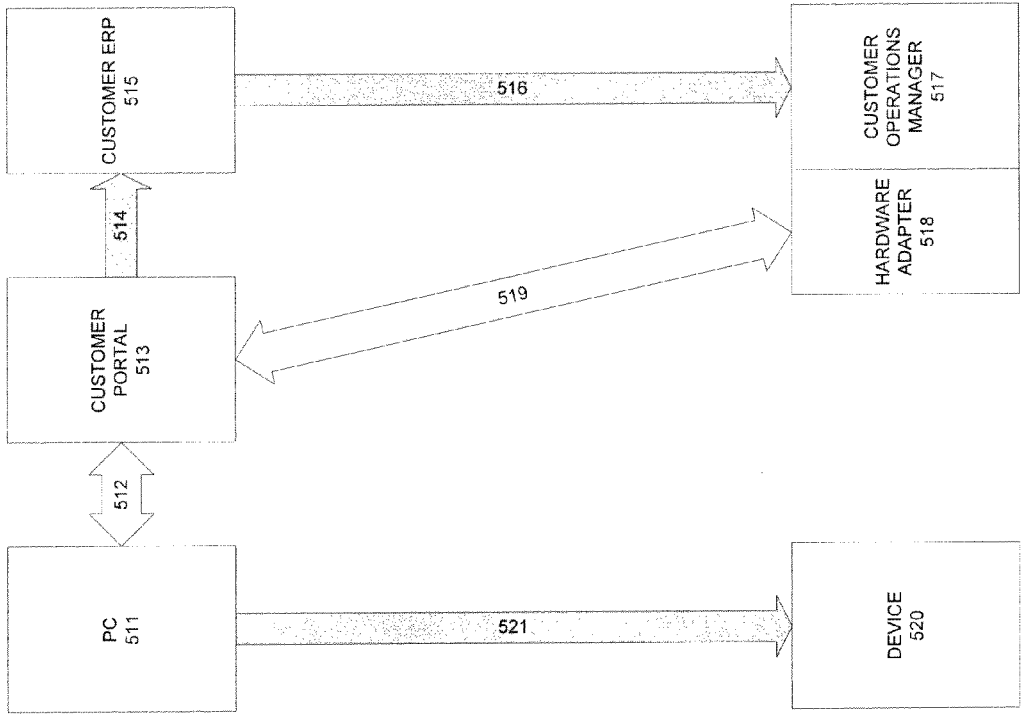
FIG. 5A is a block and communication flow diagram illustrating an online device activation within an embedded regenerative licensing system, according to one embodiment.

FIG. 5A is a block and communication flow diagram illustrating an online device activation within an embedded regenerative licensing system, according to one embodiment. A device enable transaction 502 is initiated from a customer PC 501 through a customer portal 503. The customer portal continues to pass the enable transaction request to a customer ERP (resource planner) 505, which in turn notifies a customer operations manager 507 what capabilities a device is entitled to. The device 510 connects 509 to the hardware adapter 508 to request and receive capabilities. A device capability request, generated on device 510, includes the unique identifier for device 510 and the time when the last capability response processing took place. The request is encoded and signed so the hardware adapter 508 on the operations manager 507 can verify the authenticity of the request. The hardware adapter 508 can match the timestamp included in the device capability request with the capability response it may have generated earlier for the specific device 510 and derive the device's 510 licensing state.

The hardware adapter 508 interfaces with the customer operations manager 507 for appropriate capability entitlements for the device 510. The hardware adapter 508 communicates 509 a capability response to the device 510. Capability responses are generated by the hardware adapter 508 on the operations manager 507. A capability response contains the hardware device 510 unique identifier, the list of all products and features the device 510 is entitled to and the time when the response was generated. The timestamp included in the capability response is universal time. The capability response is also encoded and signed so that the device 510 can verify its authenticity. The device 510 will only process a capability response that matches its unique identifier. The timestamp in a capability response is compared to the most recently processed request's timestamp, and the device 510 only processes responses that were generated later than the one it has already processed. When the device 510 processes a capability response, the information from the response may overwrite licensing information from the previous response. This way the capability response can be used to add new functionality to the device 510, or remove or modify existing functionality on the device 510.

Figure 5B:
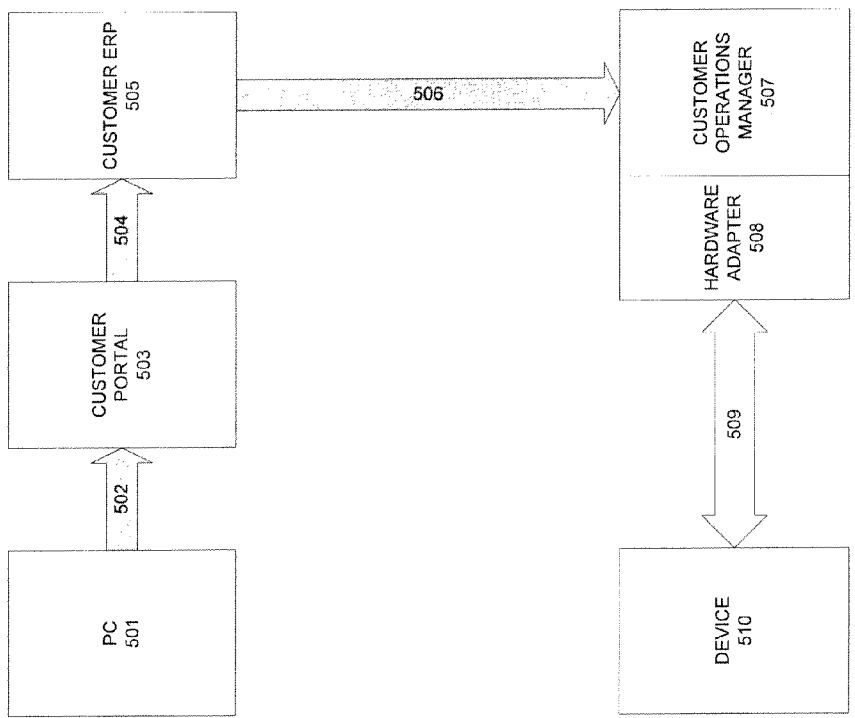
FIG. 5B is a block and communication flow diagram illustrating an offline device activation within an embedded regenerative licensing system, according to one embodiment.

FIG. 5B is a block and communication flow diagram illustrating an offline device activation within an embedded regenerative licensing system, according to one embodiment. A customer PC 511 communicates 512 a device enable request through the customer portal 513. The customer portal 513 continues to pass the enable transaction request to a customer ERP (resource planner) 514, which in turn notifies 516 a customer operations manager 517 what capabilities a device is entitled to. The customer PC 511 also communicates 512 a portal capability request for the offline device 520 through the customer portal 513 to a hardware adapter 518. The hardware adapter 518 processes the portal capability request, though unlike with a device capability request the hardware adapter 518 cannot make assumptions about the device 520 licensing state. The hardware adapter 518 on the customer operations manager 517 communicates 519 via the customer portal 513 to pass a capability response to the PC 511. The device 520 then may be activated using any communication 521 mechanism (e.g. a USB storage device, as an example) between the device 520 and the PC 511, and no response is necessary after activation. A portal capability request, generated via the portal 513 rather than the device 520, includes the unique identifier for the device 520. Verification of the portal capability request's authenticity can be limited to portal user name and password protection, in one embodiment.

Figure 6A:
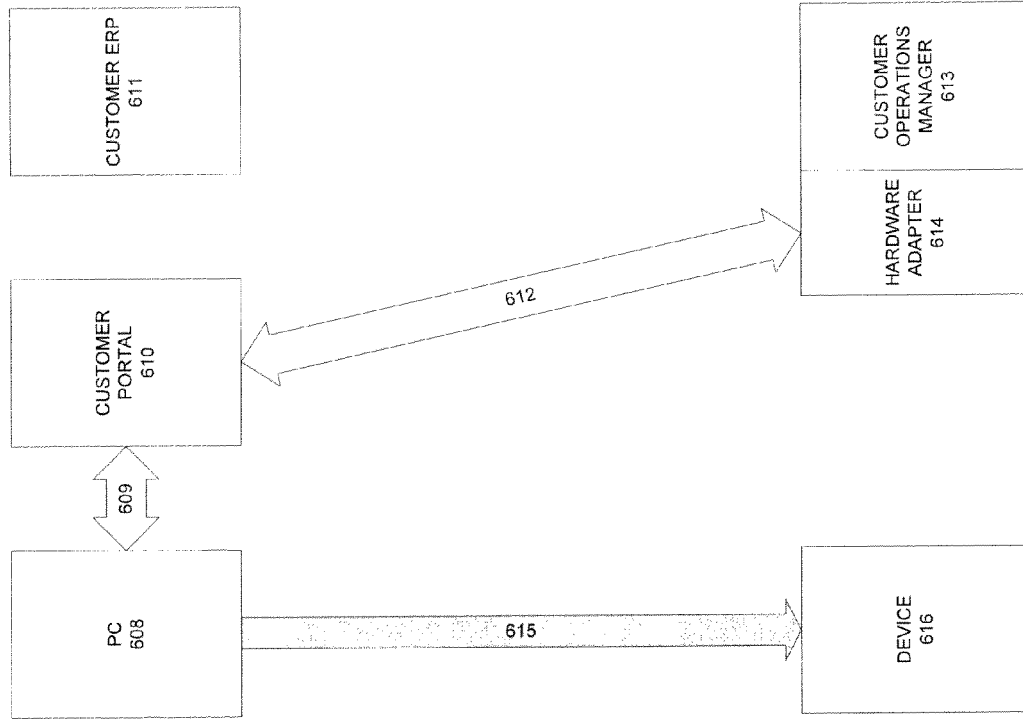
FIG. 6A is a block and communication flow diagram illustrating an online device update within an embedded regenerative licensing system, according to one embodiment.

FIG. 6A is a block and communication flow diagram illustrating an online device update within an embedded regenerative licensing system, according to one embodiment. When a device 607 is online, direct communication 606 may occur between the device 607 and the hardware adapter 605 on the customer operations manager 604. The device 607 sends a device capability request to the hardware adapter 605, and the hardware adapter responds with a capability response. The customer PC 601, customer portal 602, and customer resource planner (ERP) 603, do not need to be involved in the online device 607 update process, according to one embodiment.

Figure 6B:
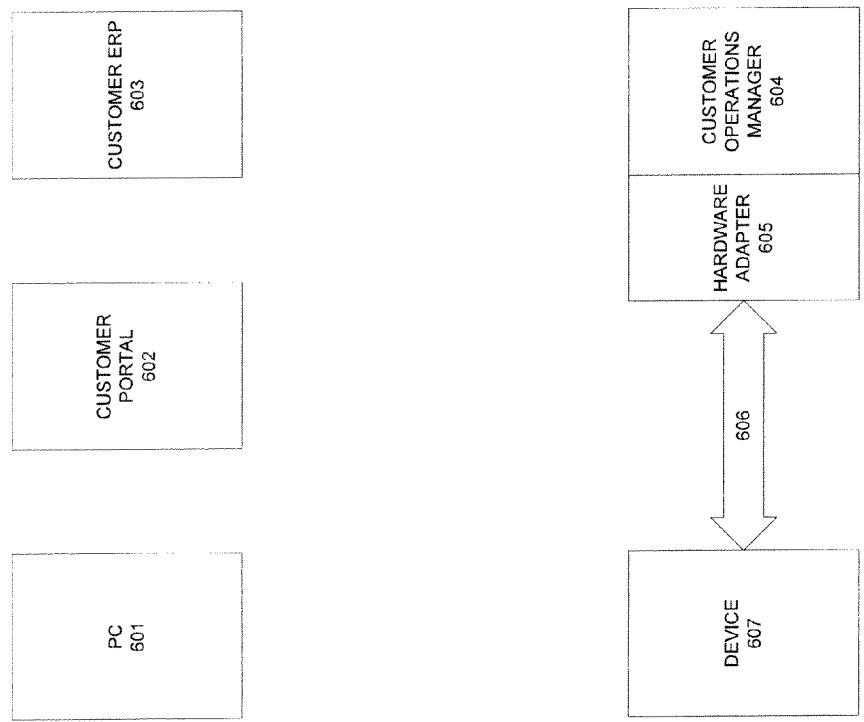
FIG. 6B is a block and communication flow diagram illustrating an offline device update within an embedded regenerative licensing system, according to one embodiment.

FIG. 6B is a block and communication flow diagram illustrating an offline device update within an embedded regenerative licensing system, according to one embodiment. A customer PC 608 communicates 609 through the customer portal 610 a portal capability request (containing such elements as described previously, in one embodiment). The customer portal 610 communicates 612 with the hardware adapter 614 on the customer operations manager 613, passing along the portal capability request. The hardware adapter 614 communicates 612 a capability response back to the customer portal 610 which is then passed back 609 to the customer PC 608. The device 616 can then be updated through any form of communication 615 (e.g. a USB storage device, as an example) between the device 616 and the PC 608.

Figure 7B:
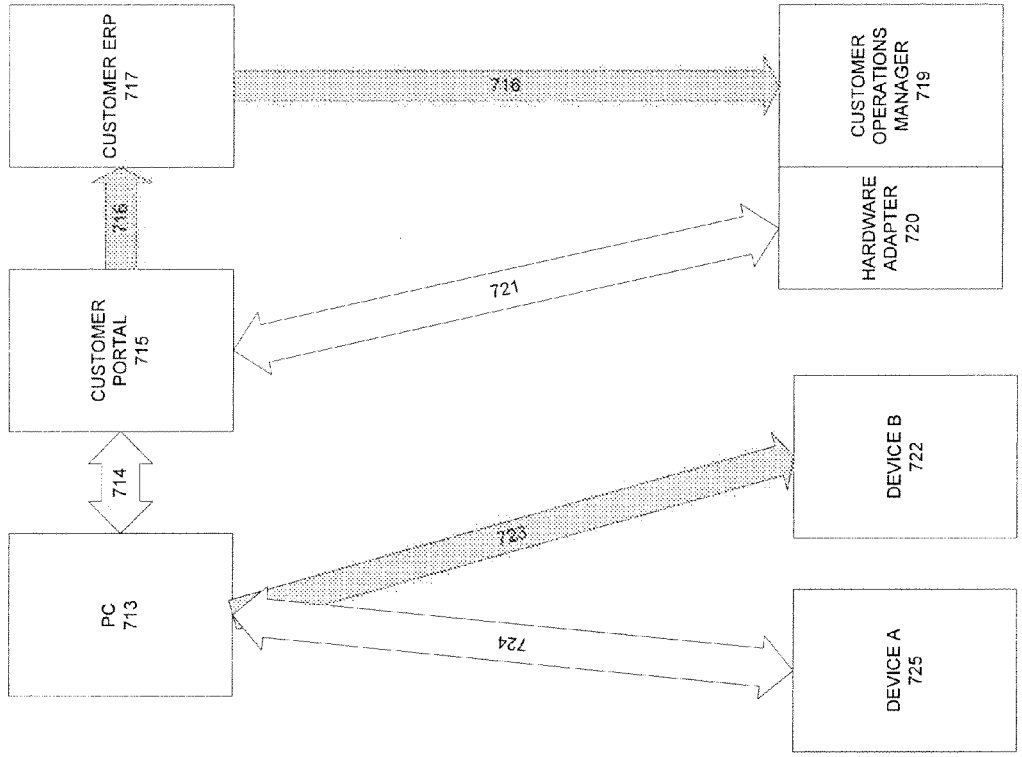
FIG. 7B is a block and communication flow diagram illustrating an offline device rehost, or transfer of capabilities, within an embedded regenerative licensing system, according to one embodiment.
Figure 7A:
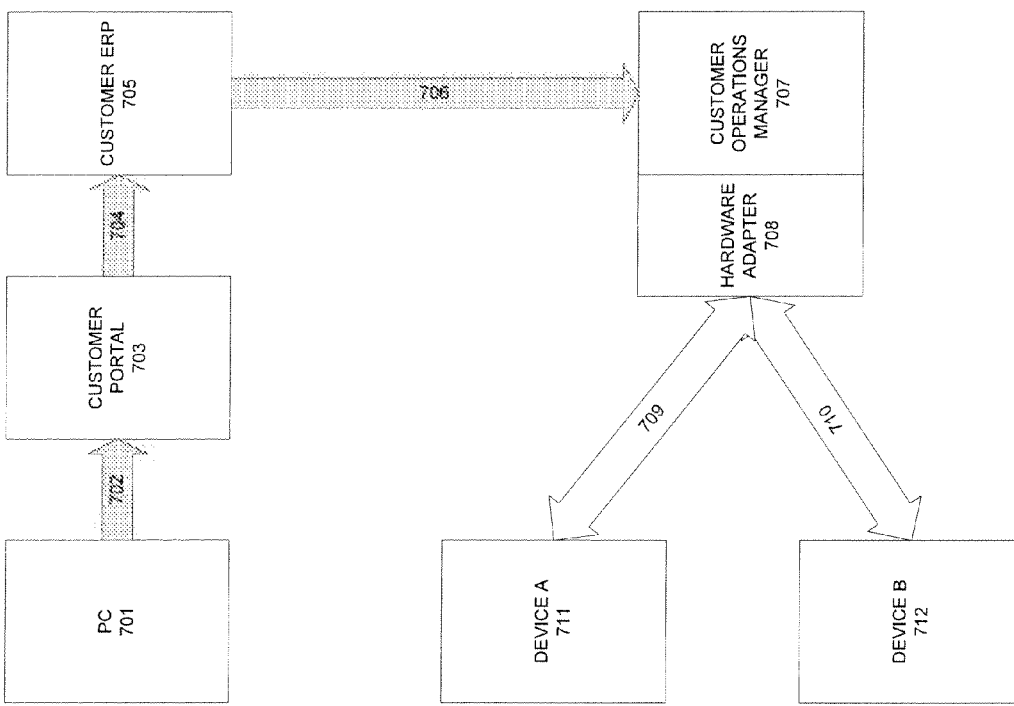
FIG. 7A is a block and communication flow diagram illustrating an online device rehost, or transfer of capabilities, within an embedded regenerative licensing system, according to one embodiment.

FIG. 7A is a block and communication flow diagram illustrating an online device rehost, or transfer of capabilities, within an embedded regenerative licensing system, according to one embodiment. A customer PC 701 requests 702 through the customer portal 703 to disable a device A 711 and to enable a device B 712. The request is communicated 704 to the customer resource planner (ERP) 705 and the transfer of capabilities information is then passed 706 to the customer operations manager 707. Device A 711 communicates 709 with the hardware adapter 708 on the customer operations manager 707, sending a capability request and receiving a capability response detailing the removal of capabilities on the device. Device A 711 completes the disable transaction with a confirmation message to the hardware adapter 720. Device B 712 communicates 710 with the hardware adapter 708 on the customer operations manager 707, sending a capability request and receiving a capability response detailing the addition of capabilities on the device. No confirmation of capabilities received is necessary from device B 712 to the hardware adapter 720, device B 712 simply functions with the new capabilities.

FIG. 7B is a block and communication flow diagram illustrating an offline device rehost, or transfer of capabilities, within an embedded regenerative licensing system, according to one embodiment. A customer PC 713 requests 714 through the customer portal 715 to disable a device A 725 and to enable a device B 722. The request is communicated 716 to the customer resource planner (ERP) 717 and the transfer of capabilities information is then passed 718 to the customer operations manager 719. The hardware adapter 720 on the customer operations manager 719 communicates 721 with the customer portal 715, handling capability requests and sending capability responses detailing the adding and removal of capabilities on device A 725 and device B 722. In general, the capability response for adding capabilities for device B would only be generated after the confirmation message was received by the hardware adapter from device A. The customer portal 715 relays 714 the capability responses back to the customer PC 713. The customer PC 713 responds 724 to a device capability request from device A 725 with a disable capability response, and device A 725 completes the disable transaction with a confirmation message to the PC 713. The PC communicates 723 to device B 722, a capability response detailing the addition of capabilities for the device. No confirmation of capabilities received is necessary from device B 722 as device B 722 simply functions with the new capabilities.

A method and system for embedded regenerative licensing have been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

We claim:

1. A computer-implemented method, comprising:
   transmitting a first capability request for a first hardware device to a hardware adapter, wherein the hardware adapter is in communication with an operations database that stores capability fulfillment data for a plurality of hardware devices, wherein the capability fulfillment data comprises licensed functionality enabled by capability responses on each hardware device of the plurality of hardware devices;
   transmitting a second capability request for a second hardware device to the hardware adapter;
   receiving a first device capability response for the first hardware device from the hardware adapter, wherein the first device capability response is generated from a first subset of the capability fulfillment data and comprises a first timestamp, a first unique identifier for the first hardware device, and a first functions list to disable on the first hardware device; and
   receiving a second device capability response for the second hardware device from the hardware adapter, wherein the second device capability response is generated from a second subset of the capability fulfillment data and comprises a second timestamp, a second unique identifier for the second hardware device, and a second functions list including one or more functions from the first hardware device to enable on the second hardware device.

2. The computer-implemented method of claim 1, wherein the first capability request is generated by a portal and comprises a first unique identifier for the first hardware device.

3. The computer-implemented method of claim 1, wherein the second capability request is generated by a portal and comprises a second unique identifier for the second hardware device.

4. The computer-implemented method of claim 1, wherein the first device capability request is generated by the first hardware device and comprises a first unique identifier for the first hardware device, and a first timestamp.

5. The computer-implemented method of claim 1, wherein the second device capability request is generated by the second hardware device and comprises a second unique identifier for the second hardware device, and a second timestamp.

6. A system for embedded regenerative licensing, comprising:
   a web server in communication with an operations database, wherein the web server further comprises an operations manager and a hardware adapter, wherein the operations database stores capability fulfillment data for a plurality of hardware devices, and wherein the capability fulfillment data comprises licensed functionality enabled by capability responses on each hardware device of the plurality of hardware devices;
   the hardware adapter in communication with a portal and a plurality of embedded systems associated with the plurality of hardware devices, wherein the hardware adapter
   receives a first capability request for a first hardware device;
   receives a second capability request for a second hardware device;
   transmits a first device capability response for the first hardware device, wherein the first device capability response is generated from a first subset of the capability fulfillment data and comprises a first timestamp, a first unique identifier for the first hardware device, and a first functions list to disable on the first hardware device; and
   transmits a second device capability response for the second hardware device, wherein the second device capability response is generated from a second subset of the capability fulfillment data and comprises a second timestamp, a second unique identifier for the second hardware device, and a second functions list including one or more functions from the first hardware device to enable on the second hardware device;
   a resource planner and manager in communication with the operations manager; and
   the portal in communication with the resource planner and manager.

7. The hardware adapter of claim 6, further comprising:
   an embedded protocol for communication with one or more embedded systems; and
   license generation and regenerative activation logic.

8. The plurality of embedded systems of claim 6, further comprising a hardware device and client application integration.

9. The plurality of embedded systems of claim 8, wherein the client application integration further comprises a licensing micro-kernel and service interfaces.

10. The system of claim 6, wherein the first capability request is generated by the portal and comprises a first unique identifier for the first hardware device.

11. The system of claim 6, wherein the second capability request is generated by the portal and comprises a second unique identifier for the second hardware device.

12. The system of claim 6, wherein the first device capability request is generated by the first hardware device and comprises a first unique identifier for the first hardware device, and a first timestamp.

13. The system of claim 6, wherein the second device capability request is generated by the second hardware device and comprises a second unique identifier for the second hardware device, and a second timestamp.

14. A non-transitory computer-readable medium having stored thereon a plurality of instructions, the plurality of instructions when executed by a processor, cause the processor to perform:

transmitting a first capability request for a first hardware device to a hardware adapter, wherein the hardware adapter is in communication with an operations database that stores capability fulfillment data for a plurality of hardware devices, wherein the capability fulfillment data comprises licensed functionality enabled by capability responses on each hardware device of the plurality of hardware devices;

transmitting a second capability request for a second hardware device to the hardware adapter;

receiving a first device capability response for the first hardware device from the hardware adapter, wherein the first device capability response is generated from a first subset of the capability fulfillment data and comprises a first timestamp, a first unique identifier for the first hardware device, and a first functions list to disable on the first hardware device; and receiving a second device capability response for the second hardware device from the hardware adapter, wherein the second device capability response is generated from a second subset of the capability fulfillment data and comprises a second timestamp, a second unique identifier for the second hardware device, and a second functions list including one or more functions from the first hardware device to enable on the second hardware device.

15. The computer-readable medium of claim 14, wherein the first capability request is generated by a portal and comprises a first unique identifier for the first hardware device.

16. The computer-readable medium of claim 14, wherein the second capability request is generated by a portal and comprises a second unique identifier for the second hardware device.

17. The computer-readable medium of claim 14, wherein the first device capability request is generated by the first hardware device and comprises a first unique identifier for the first hardware device, and a first timestamp.

18. The computer-readable medium of claim 14, wherein the second device capability request is generated by the second hardware device and comprises a second unique identifier for the second hardware device, and a second timestamp.

* * * * *